Aug. 9, 1932.　　　A. L. DOMAICA　　　1,870,240
CEREAL WEIGHING AND TRANSPORTING DEVICE
Filed Dec. 22, 1928
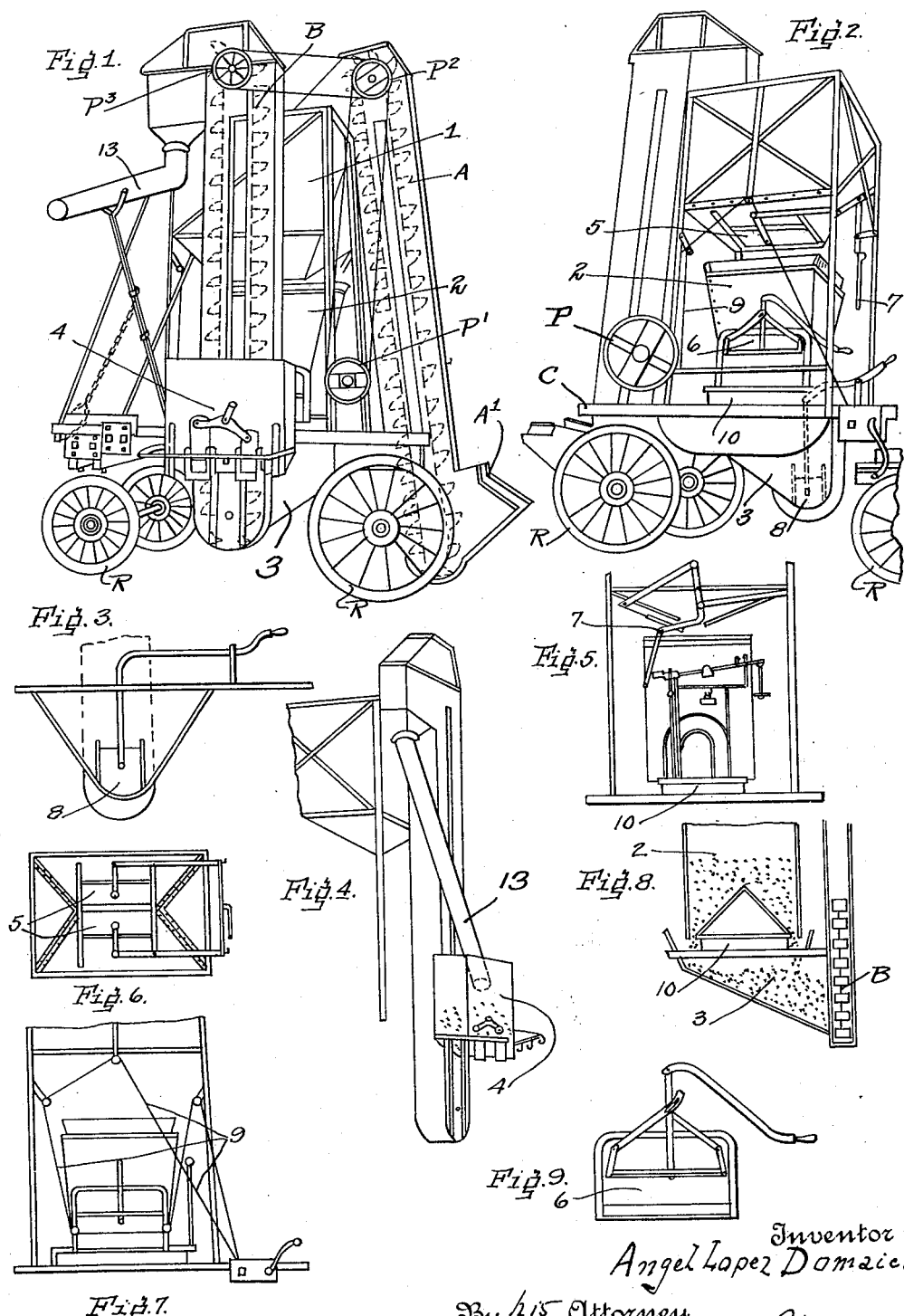

Patented Aug. 9, 1932

1,870,240

UNITED STATES PATENT OFFICE

ANGEL LOPEZ DOMAICA, OF LAS ROSAS, ARGENTINA

CEREAL WEIGHING AND TRANSPORTING DEVICE

Application filed December 22, 1928, Serial No. 328,036, and in Argentina October 10, 1928.

The present invention refers to a new portable elevating-weighing apparatus for cereals, applicable to threshing machines, corn-shellers, and the like, by means of which is solved in a practical and simple manner, the problem relating to the transport of the cereal, inasmuch as the use of bags is avoided, which is in itself an important factor, as the cereal can be transported in bulk from the machine, thresher, or corn-sheller to any desired point instantly, as soon as it has been shelled or threshed, and moreover it is weighed with all exactitude.

In order that my invention may be more comprehensible, I have illustrated same with various figures, in which:

Fig. 1 is a view of the main or principal side of the apparatus.

Fig. 2 is a view of the opposite side.

Fig. 3 is a detail view of the door communicating with the second elevator.

Fig. 4 is a view of the tube and detail of the bag filler.

Fig. 5 is a view of the weighing scale and detail of the hopper and its lever.

Fig. 6 is a detail view in connection with the doors of the first hopper, with the combination for opening same by means of its lever.

Fig. 7 is a detail view in connection with the capstan to lift the second hopper and change the weighing scale.

Fig. 8 is a sectional view of the third hopper.

Fig. 9 is a detail view in connection with the doors of the second hopper.

Construction

The construction comprises two elevators, three hoppers, one of which is mounted on an ordinary weighing scale, with corresponding discharging doors, and a movable tube, mounted all upon a chassis (C) and wheels (R).

The elevator (A), the receiving mouth (A¹) of which is seen in Fig. 1, has arranged in its interior the conveyer shown in dotted lines, which is operated by the pulley (P²), which in turn is connected to and operated from pulley (P¹), on the shaft of pulley (P), Fig. 2, the latter being operated from a rotary part of the thresher, corn-sheller or the like, to which the apparatus has been moored.

The elevator (A) discharges into the hopper (1), which in its lower part has a door (5), Figs. 2 and 6. This door is opened by means of lever (7).

A second hopper (2) rests on the platform of a weighing scale (10) of customary construction; this hopper can be raised by means of the capstan (9), Fig. 7.

A third hopper (3) has an inner door (8), in order to send the cereal either to the elevator (B) or to the bag-filler (4).

The elevator (B), contains the conveyer which is shown in dotted lines, Fig. 1, operated by pulley (P³), connected with and operated from pulley (P²).

The tube (13) discharges the cereal either into motor trucks, carts, etc., or to the bag-filler (4), Fig. 4, and as the cereal is received already weighed, it may be bagged in the usual manner.

The material employed in the different parts of the apparatus, may be any which is adaptable to the distinct functions to be fulfilled.

Working

Once the apparatus is placed alongside the thresher, corn-sheller, or similar machine, the pulley (P) is connected to a pulley of said machine, the mooring being effected in such a manner that the receiving mouth (A¹) will be directly below the discharge mouths of the machine, thresher, corn-sheller or the like.

The cereal received in the mouth (A¹) is raised by the elevator (A) and dumped into the hopper (1), Fig. 1; the conveyer of said elevator being shown in dotted lines and arrows indicate the direction of its movement.

On the hopper (1) being loaded, the door (5) is opened by means of lever (7), Fig. 2, and the cereal is discharged into the second hopper (2), and once this is loaded, the door of hopper (1) is closed in order to effect the weighing operation, as this hopper (2)

is located on the platform of the weighing scale (10).

After the weighing has been effected, the cereal passes upon opening of the door (6) to the third hopper (3), which discharges it into the elevator (B), the conveyer of which in turn raises the cereal in bulk onto carts, motor trucks, etc.

As soon as the cereal has been weighed in the second hopper (2) and has passed to the third hopper (3), the door (6) of the second hopper (2) is closed, and this latter hopper is ready to again receive the cereal from the first hopper (1), weighing same, the operation being repeated as often as desired.

The door (8) of the hopper (3) is opened when the conveyer in elevator (B) should raise the cereal, and is closed when this operation should not be effected, in order to permit another empty cart or motor truck to be placed alongside the apparatus.

When it is desired, instead of loading the cereal in bulk onto carts or motor trucks, to bag same, then the tube (13) is led direct to the bag-filler (4), allowing the weighed cereal to be bagged, if it is so desired.

In order to effect an adjustment or inspection of the weighing scale (10), the second hopper (2) may be lifted, empty or loaded, by means of the capstan (9), Fig. 7, to a sufficient height to allow the weighing scale (10) to be withdrawn and changed.

The first hopper (1) has a capacity four times greater than the second hopper (2), which allows the person attending to the weighing, sufficient time to operate the levers of the doors of all the hoppers, without it being necessary to suspend work on the machine, thresher, corn-sheller, or the like, and it also allows carts, motor trucks and other vehicles to be easily changed.

The capacity of the apparatus is 25 tons per hour, but this figure is variable, and may be increased or decreased according to cases and circumstances which may arise.

Having thus described my invention and the manner of carrying it out in practice, I claim:

A cereal weighing and transporting device, comprising a wheeled frame, an elevator on said frame having a mouth for receiving the cereal from a thresher and sheller, an upper hopper, means for conveying the cereal received by said mouth to said upper hopper, a normally closed door in the bottom of said hopper, means for opening said door, a platform scale, a hopper on said scale adapted to receive the cereal discharged through said door, means for elevating said last named hopper above the platform of said scale allowing a removal of the latter, a third hopper, means for controlling the discharge of the weighed cereals into said third hopper, a discharge nozzle for said cereals, and a conveyer for elevating the cereal from said third hopper into said nozzle.

In testimony whereof I affix my signature.

ANGEL LOPEZ DOMAICA.